R. SHALER.
BALANCE.
No. 51,226. Patented Nov. 28, 1865.
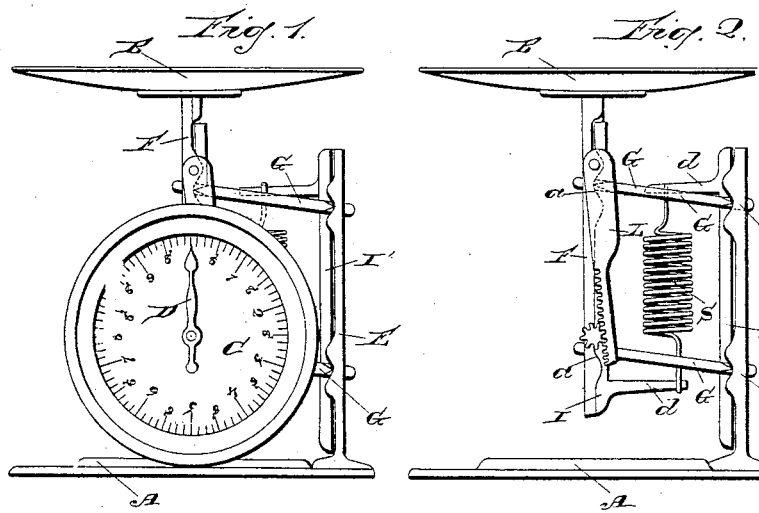
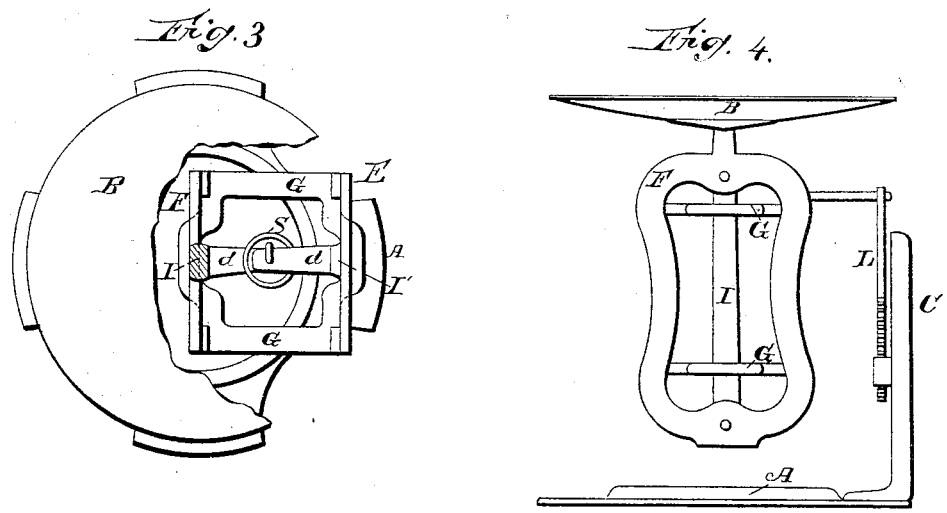
Witnesses
Mary A. Hine
Henry Stoddard
Inventor
Reuben Shaler
Philipott
John E. Earle

UNITED STATES PATENT OFFICE.

REUBEN SHALER, OF MADISON, CONNECTICUT.

IMPROVEMENT IN BALANCES.

Specification forming part of Letters Patent No. 51,226, dated November 28, 1865.

*To all whom it may concern:*

Be it known that I, REUBEN SHALER, of Madison, in the county of New Haven and State of Connecticut, have invented a new and useful Improvement in Weighing-Scales; and I do hereby declare the following, when taken in connection with the accompanying drawings, and the letters of reference marked thereon, to be a full, clear, and exact description of the same, and which said drawings constitute part of this specification, and represent, in—

Figure 1, a front view; Fig. 2, the same view with the dial removed to show the working parts; Fig. 3, a top view, the pan broken to show the working parts; Fig. 4, a side view.

My invention relates to an improvement in counter-scales, or such as are used for light weights, its object being to reduce the friction upon the bearings.

In the ordinary scales the bearings are so arranged that the article to be weighed increases the friction in proportion as the article is heavier, for the reason that the bearings support the weight. By my invention the bearings are arranged, so that the weight upon the bearings is the same, or nearly so, under all circumstances, and consequently the friction is the same.

To enable others skilled in the art to construct and use my improvement, I will proceed to fully describe the same as illustrated in the accompanying drawings.

A is the base which supports the scale, B the pan or plate upon which the article is placed, C the dial upon which the weight is indicated, and D the indicator.

E is a support resting upon the base A; F, a similar support, upon which the pan B is placed, but independent of the base A. The support F is placed at a little distance from the support E, as seen in Fig. 3.

Between the two supports F and E are placed parallel bars G G, resting in notches $a$, as seen in Fig. 2, constructed in similar manner as the bearings of ordinary scales, and are prevented from displacement by a curvature upon either side, which pass outside of bars I and I'. (See Figs. 2 and 4.)

Upon the lower end of the bar I and upon the upper end of the bar I' a projection, $d$, is formed, between which a spring, S, is fixed, secured to each of the projections $d$ at the required tension, so that any article placed upon the pan B would depress the pan and extend the spring S in proportion to its weight.

To the support F a toothed rack, L, (see Figs. 2 and 4,) is fixed, which gears into a pinion, $n$, (see Fig. 2,) to which the indicator D is attached, so that when the pan B is depressed the indicator D will be proportionately turned around the dial C, indicating the weight or force of the depression.

The spring S may be arranged with screws for the purpose of adjustment in a common and well known manner.

By this construction it will be obvious that the weight upon the pan does not increase the friction upon the bearing to any extent as compared with the ordinary construction.

Having, therefore, thus fully described my invention, what I claim as new and useful, and desire to secure by Letters Patent, is—

The combination of the supports E and F, the parallel bars G G, and a spring, S, or its equivalent, arranged substantially in the manner and for the purpose specified.

REUBEN SHALER.

Witnesses:
 JOHN E. EARLE,
 MARY A. HINE.